(12) United States Patent
Beers

(10) Patent No.: US 6,715,804 B2
(45) Date of Patent: Apr. 6, 2004

(54) FISHERMAN'S KNOT TIER

(76) Inventor: Daniel James Beers, 416 River St., Salmon, ID (US) 83467

( * ) Notice: Subject to any disclaimer, the term of this patent is extended or adjusted under 35 U.S.C. 154(b) by 0 days.

(21) Appl. No.: 10/354,832

(22) Filed: Jan. 29, 2003

(65) Prior Publication Data

US 2004/0004355 A1 Jan. 8, 2004

Related U.S. Application Data

(60) Provisional application No. 60/393,543, filed on Jul. 5, 2002.

(51) Int. Cl.[7] .................................................. D03J 3/00
(52) U.S. Cl. ............................ 289/17; 289/18.1; 43/4
(58) Field of Search ......................... 289/1.2, 1.5, 17, 289/18.1; 7/106; 43/1, 4, 43.16

(56) References Cited

U.S. PATENT DOCUMENTS

| | | | | |
|---|---|---|---|---|
| 2,758,858 A | * | 8/1956 | Smith, Sr. ................... | 289/17 |
| 2,895,478 A | * | 7/1959 | Post .......................... | 606/148 |
| 2,926,036 A | * | 2/1960 | Wimberley ............... | 289/17 |
| 2,934,369 A | * | 4/1960 | Kennedy ................... | 289/17 |
| 3,101,964 A | * | 8/1963 | Reaser ...................... | 289/17 |
| 3,180,665 A | * | 4/1965 | Bartlett ..................... | 289/17 |
| 3,252,724 A | * | 5/1966 | Kearns ...................... | 289/17 |
| 3,265,422 A | * | 8/1966 | Pierce ....................... | 289/17 |
| 3,396,998 A | * | 8/1968 | Scoville .................... | 289/17 |
| 3,419,924 A | * | 1/1969 | Archibald .................. | 7/106 |
| 3,521,918 A | * | 7/1970 | Hammond ................. | 289/17 |
| 3,575,449 A | * | 4/1971 | Browning .................. | 289/1.5 |
| 3,625,556 A | * | 12/1971 | Stromberg ................ | 289/17 |
| 3,825,961 A | * | 7/1974 | Klein ........................ | 7/106 |
| 3,965,605 A | * | 6/1976 | Allen ........................ | 289/17 |
| 4,029,346 A | * | 6/1977 | Browning .................. | 289/17 |
| 4,101,152 A | * | 7/1978 | Gardipee .................. | 289/17 |
| 4,188,052 A | * | 2/1980 | Browning .................. | 289/17 |
| 4,403,797 A | * | 9/1983 | Ragland, Jr. .............. | 289/17 |
| 4,660,314 A | * | 4/1987 | Janssen et al. ............ | 289/17 |
| 4,765,082 A | * | 8/1988 | Nicholas ................... | 289/17 |
| 4,864,762 A | * | 9/1989 | Cox .......................... | 289/17 |
| 4,899,482 A | * | 2/1990 | Gerdes ...................... | 43/4 |
| 5,383,695 A | * | 1/1995 | Couper ...................... | 289/17 |
| 5,557,874 A | * | 9/1996 | Pietrandrea et al. ....... | 43/4 |
| 5,685,037 A | * | 11/1997 | Fitzner et al. ............. | 7/106 |
| 5,951,067 A | * | 9/1999 | High ......................... | 289/17 |
| 6,061,858 A | * | 5/2000 | Shepard .................... | 7/106 |
| 6,272,709 B1 | * | 8/2001 | Strini ........................ | 7/106 |
| 6,434,878 B1 | * | 8/2002 | Milton ...................... | 43/4 |

* cited by examiner

*Primary Examiner*—Gary L. Welch
(74) *Attorney, Agent, or Firm*—Daniel J. Beers

(57) ABSTRACT

Most of the present knot tying devices require the mechanical or manual sliding of the leader or line from some object such as a nail or tube onto a leader or line. This invention does not require such a transfer. The Fisherman's Knot Tier in accordance with the present invention looks and works similar to a retractable ballpoint pen with an alligator clip or modified alligator clip/cutter attached. When a line is placed in the exposed slot in the shaft, and the shaft is retracted into the tip, cone or insert, the line is secured. The jaws of the alligator clip or modified alligator clip/cutter holds the hook or similar article during the knot tying operation. The cutter portion of the clip/cutter is used to trim excess leader or line from the hook or similar article after the knot tying process is complete. The jaws of the alligator clip or modified alligator clip/cutter also doubles as a clip to hold the knot tier in a shirt or vest pocket.

3 Claims, 2 Drawing Sheets

FISHERMAN'S KNOT TIER

This application is based on provisional application No. 60/393,543, filed Jul. 5, 2002

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

In fishing, especially the art of fly fishing, to be successful, the fisherman must be able to change to different flies, hooks or similar article depending on the water conditions and upon what insect or hatch the fish are feeding on. During the course of time on the water, the angler may change flies, hooks, or similar article many times. Because of these numerous changes, it is desirable to be able to tie a secure knot in a timely and efficient manner. Each time the fly, hook or similar article is changed, the leader or line is shortened. To decrease tying time and minimize this loss of line or leader, a convenient and easy to use tool needed to be invented.

A number of special devices have been suggested for assisting anglers and others in the knot tying process. Most of the present, knots tying devices require the mechanical or manual sliding of the leader or line from some object such as a nail or tube onto a leader or line. This invention does not require such a transfer. Descriptions of some of prior art knot tying devices are contained in the following list; whish list is not all-inclusive but merely representative.

U.S. Pat. No. 2,758,858 Smith Aug. 15, 1956 Knot-Tying Implement
U.S. Pat. No. 2,895,478 Post Jul. 21, 1959 Suture-Tying Instrument
U.S. Pat. No. 2,926,036 Wimberley Feb. 23, 1960 Fisherman's Knot Tying Tool
U.S. Pat. No. 4,101,152 Gardipee Jul. 18, 1978 Fisherman's Knot tying Tool
U.S. Pat. No. 4,864,762 Cox Sep. 12, 1989 Line Tying Device
U.S. Pat. No. 4,899,482 Gerdes Feb. 13, 1990 Multi-Utility Fishing Tool
U.S. Pat. No. 5,557,874 Pietrandrea et al. Sep. 24, 1996 Multi-Purpose Fishing Tool
U.S. Pat. No. 5,951,067 High Sep. 14, 1999 Knot tyer
U.S. Pat. No. 6,061,858 Shepard May 16, 2000 Fishing Device
U.S. Pat. No. 6,272,709 Strini Aug. 14, 2001 Combination Forceps and Knot Tying Device

SUMMARY OF THE INVENTION

The Fisherman's knot tier, in accordance with the present invention, includes, in general, two elongated hollow bodies or barrels joined together by circular internal and external threads or an overlapping glueable joint and reductions in diameter with a coil expansion spring-mounted tubular piston or shaft, and a second piston/push button therein and an alligator clip or modified alligator clip/cutter mounted thereon.

The upper barrel has internally mounted threads or an overlapping glueable joint at one end of the elongated hollow body. The upper barrel also contains a terminal bore located longitudinally and centered at the distal end of the barrel from the internally-mounted threads or overlapping glueable joint. This terminal bore located therein creates a shoulder. An alligator clip or modified alligator clip/cutter is attached to the outer surface of the upper barrel near the terminal bore.

The lower barrel has externally recessed threads or a reduction in diameter located at one end of the elongated hollow body. The recessed threads or a reduction in diameter also creates a shoulder. A tapered end is located longitudinally on the distal end of the lower elongated hollow body from the externally mounted recessed threads or reduction in diameter. The lower elongated hollow body also has a longitudinal terminal bore at the tapered end of the body. The terminal bore located therein creates a shoulder. The lower barrel may or may not have a rubber finger grip attached to the outer surface. The lower barrel may or may not contain an insert in the tapered end of the barrel.

The upper and lower barrels have two pistons slidably mounted and constrained within them.

The coil expansion spring-mounted tubular piston or shaft housed within the upper and lower barrels, has lug members or a stop located near one end of the tubular piston or shaft and a slot located near the same end of the tubular piston or shaft. The slot is cut to a depth of ½ to ⅔ the diameter of the tubular piston or shaft. This slot is at an incline less than 90 degrees measured from the long longitudinal side of the tubular piston or shaft. The end opposite the slotted end of the tubular piston or shaft fits into a bore in the second or upper piston.

A coiled expansion spring encircles the slotted end of the tubular piston or shaft. One end of the coiled expansion spring abuts the lugs or stop on the tubular piston or shaft and the other end abuts the shoulder created by the terminal bore, or the shoulder of an insert, if so equipped, in the lower elongated hollow body.

The upper piston housed within the upper and lower barrels has a bore centered and extending on the longitudinal axis into one end of the upper piston a short distance. At the opposite longitudinal end of the piston, a reduction in diameter creates a shoulder and push button.

The clip/cutter, in accordance with the present invention, in general, is a modified alligator clip with cutting surfaces thereon. The clip/cutter consists of two jaws hinged together by a common pivot pin, with suitable ears being provided to hold the pin and the ears are extended to provide U-shaped arms for a continuation of the jaws. The U-shaped arms are to actuate the jaws and incorporate the cutting edges. A coil spring, wound around the pivot pin, has opposite ends in contact with each of the U-shaped arms to keep the jaws in bias and towards each other.

The U-shaped jaw on the upper half of the clip has serrated teeth to aid in holding a fishhook or similar article therein, or clipping the Knot tier in a shirt or vest pocket. The U-shaped arm of the upper half of the clip has two cutting surfaces that may be flat or ground at an incline to the horizontal axis of the jaw located thereon.

The jaw on the lower half of the clip is smooth and curved to allow for easy attachment of the clip to the upper barrel and aid in holding a fishhook or similar article therein, or for easily clipping the Knot tier in a shirt or vest pocket. The U-shaped arm of the lower half of the clip has two cutting surfaces that may be flat or ground at an incline to the horizontal axis of the U-shaped arm.

DESCRIPTION OF THE SEVERAL VIEWS OF THE DRAWING

Further objectives and advantages of the invention will be better understood by reference to the following description in connection with the accompanying drawings.

DETAILED DESCRIPTION OF THE INVENTION

Figure 1:
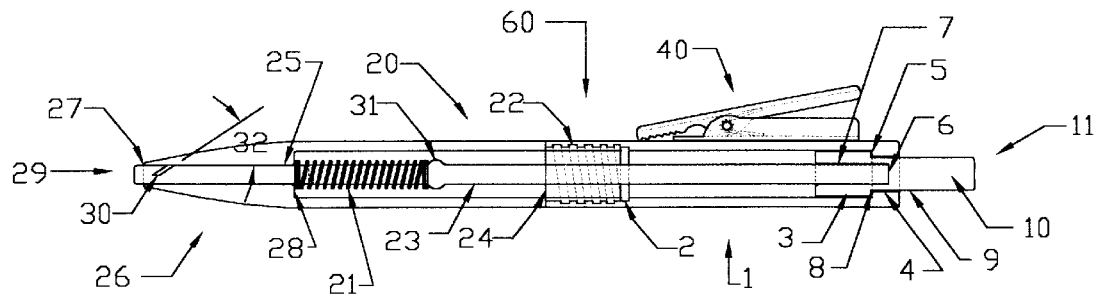
FIG. 1 A plan view of the knot tier of the persent invention with the tubular piston or shaft retracted with the upper and lower barrels joined together by internal and external threads.
Figure 2:
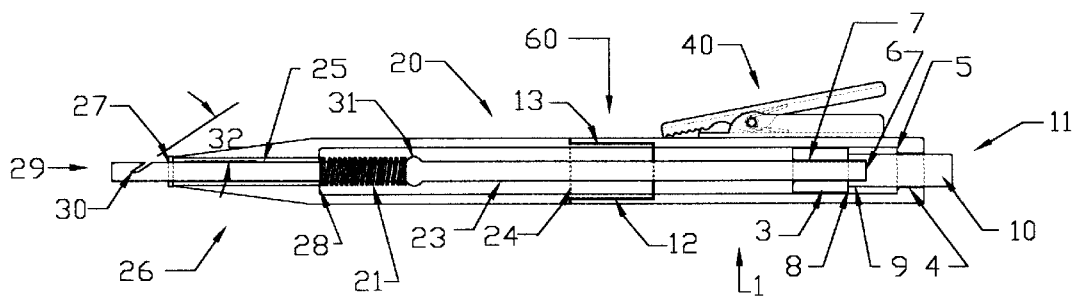
FIG. 2 A plan view of the knot tier of the present invention with the tubular piston or shaft extended, and the upper and lower barrels joined by an overlapping glueable joint and a reduction in diameter, and with an insert in place.
Figure 3:
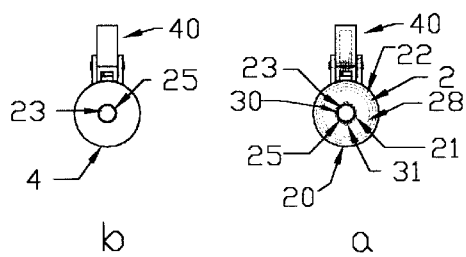
FIG. 3 A left end plan view of the knot tier of the present invention.
 a. With hidden lines shown
 b. With hidden lines not shown.
Figure 4:
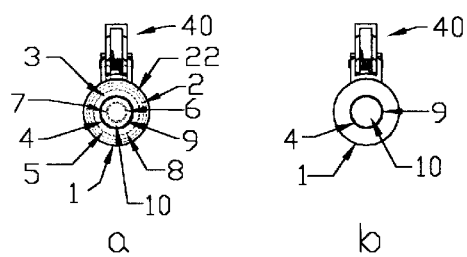
FIG. 4 A right end plan view of the knot tier of the present invention.
 a. With hidden lines shown
 b. With hidden lines not shown FIG. 5 A plan view of the attached clip/cutter of the present invention.
 a. Left-end view
 b. Side view
 c. Right-end view FIG. 6 A successive schematic diagrams illustrating the knot tying process using the Fisherman's Knot Tier.
Figure 5:
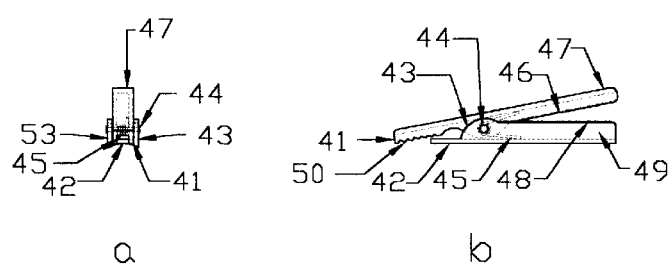

Referring now more particularly to the drawings, reference numerals are used to denote like parts or structural features in the different views. While a particular embodiment of the invention has been shown and described, it will be understood that the invention is not limited hereto, since modifications may be made that will become apparent to those skilled in the art. A knot tier 60, embodying the principles of the present invention, is shown in FIGS. 1–5 of the drawing to illustrate the presently preferred embodiment of the invention. The Fisherman's knot tier 60, in accordance with the present invention, includes, in general, two elongated hollow bodies, or barrels 1 and 20. The two barrels 1 and 20 are joined together by circular internal 2 and external 22 threads or an overlapping glueable joint 12 and a reduction in diameter 13 with a coil expansion spring-mounted lower tubular piston or shaft 23 and a second upper piston 3 therein and an alligator clip or modified alligator clip/cutter 40 mounted thereon.

The barrels 1 and 20 have two pistons 3 and 23 slidably mounted and constrained within the two elongated hollow bodies or members 1 and 20.

The upper barrel 1 has internally mounted threads 2 or an overlapping, glueable joint 12 at one end of the elongated hollow body 1. The upper barrel 1 also contains a terminal bore 4 located longitudinally and centered at the distal end of the barrel 1 from the internally mounted threads 2 or an overlapping, glueable joint 12. This terminal bore 4 located therein creates a shoulder 5. An alligator clip or modified alligator clip/cutter 40 is attached to the outer surface of the upper barrel 1 near the terminal bore 4.

The lower barrel 20 has externally-recessed threads 22 or a reduction in diameter 13 located at one end of the elongated hollow body 20 and the recessed threads 22 or a reduction in diameter 13 also create a shoulder 24. A tapered end 26 is located longitudinally on the distal end of the lower elongated hollow body 20 from the externally mounted recessed threads 22 or a reduction in diameter 13. The lower elongated hollow body 20 also has a longitudinal terminal bore 25 at the tapered end 26 of the body 20. The terminal bore 25 located therein creates a shoulder 28. The tip 27 of the lower barrel 20 may be formed by a cone or insert.

The tubular piston or shaft 23 has lug members or stop 31 located near one end 29 of the tubular piston or shaft 23, and a slot 30 located near the same end 29 of the tubular piston or shaft 23. The slot 30 is cut to a depth of ½ to ⅔ the diameter of the tubular piston or shaft 23. The slot is cut at an incline of less than 90 degrees measured from the long longitudinal side 32 of the tubular piston or shaft 23. The end 6 opposite the slotted end 29 of the tubular piston or shaft 23 fits into a bore 7 in the upper piston 3.

The upper piston 3 has a bore 7 centered and extending on the longitudinal axis into one end of the upper piston 3 a short distance. At the distal longitudinal end 11 of the upper piston 3, a reduction in diameter 9 creates a shoulder 8 and push button 10.

A coiled expansion spring 21 encircles the slotted end 29 of the tubular piston or shaft 23. One end of the coiled expansion spring 21 abuts the lugs or stop 31 on the tubular piston or shaft 23 and the other end abuts the shoulder 28 created by the terminal bore 25 in the lower elongated hollow body 20 or the end of the insert 27.

When the button 10 is pressed, the longitudinal transfer of motion to the tubular piston or shaft 23 causes the lugs or stop 31 on the tubular piston or shaft 23 to exert pressure on one end of the coil expansion spring 21. This longitudinal transfer of motion in turn depresses the other end of the coil expansion spring 21 against the shoulder 28 of the terminal bore 25 within the lower elongated hollow body 20 or the end of the insert 27. This continued transfer of motion forces the slotted end 29 of the tubular piston or shaft 23 to protrude beyond the distal end, cone or insert 27 of the lower elongated hollow body 20.

When pressure on the button 10 is released the opposing longitudinal transfer of motion created by the coil expansion spring 21 against the shoulder 28 of the terminal bore 25 within the lower elongated hollow body 20 or the end of the insert 27, and longitudinal transfer of motion against the lugs or stop 31 on the tubular piston or shaft 23 created by the coil expansion spring 21, cause the tubular piston or shaft 23 to recede back into the lower elongated hollow body 20. When this transfer of motion is completed the slot 30 located near the tip, cone or insert 27 of the tubular piston, or shaft 23, will no longer protrude beyond the tip, cone or insert 27 of the lower elongated hollow body 20.

A clip/cutter 40, in accordance with the present invention, in general, is a modified alligator clip 40 with cutting surfaces 46, 56, 48, and 58 thereon. The clip/cutter 40 consists of two jaws 41 and 42 hinged together by a common pivot pin 44, with suitable ears 43 and 53 being provided for that purpose. The ears 43 and 53 are extended to provide U-shaped arms 47 and 49 for a continuation of the jaws 41 and 42. The U-shaped arms 47 and 49 are to actuate the jaws 41 and 42 and incorporate the cutting edges 46 and 56 with cutting edges 48 and 58. A coil spring 45, wound around the pivot pin 44, has opposite ends in contact with each of the U-shaped arms 47 and 49 to keep the jaws 41 and 42 in bias and towards each other.

The U-shaped jaw 41 on the upper half of the clip 40 has serrated teeth 50 to aid in holding a fishhook or similar article therein or for clipping the Knot tier 60 in a shirt or vest pocket. The U-shaped arm 47, of the upper half of the clip 40, has two cutting surfaces 46 and 56 that are flat or may be ground at opposite inclines to the horizontal axis of the upper jaw 47 located thereon.

The jaw 42 on the lower half of the clip 40 is smooth and curved to allow for attachment of the clip to the upper barrel and ease of clipping the Knot tier 60 in a shirt or vest pocket and to aid the upper U-shaped jaw 41 in holding a fishhook or similar article therein. The U-shaped arm 49 of the lower half of the clip 40 has two cutting surfaces 48 and 58 which are flat or may be ground at opposite inclines to the horizontal axis of the lower U-shaped arm 49. The inclines or flat surfaces 46 and 56 of the upper arm 47 and the meshing inclines or flat surfaces 48 and 58 of the lower arm 49 are at the same angle to create a shearing action when the U-shaped upper and lower arms 47 and 49 are forced together.

When pressure is applied to the upper U-shaped arm 47 of the clip 40, the upper U-shaped arm 47 of the clip 40 is forced toward the U-shaped lower arm 49 of the clip 40 as they pivot around the pivot pin 44. This action opens the jaws 41 and 42, while at the same time forces the cutting edges 46 and 56, and the cutting edges of 48 and 58 of the U-shaped arms 47 and 49 together in a shearing action. When the pressure to the upper U-shaped arm 47 of the clip 40 is released, the opposing pressure caused by the action of the coil spring 45 returns the jaws 41 and 42 to the closed biased position and the U-shaped arms 47 and 49 to the open position.

This invention has been described in detail with reference to a particular embodiment thereof but it will be understood that various other modifications can be effected within the scope and spirit of the invention. It will also be understood that various omissions, substitutions and changes in the form and details of the device and its operation can be made by those skilled in the art without departing from the spirit of the invention. These might include but not limited to modifications made during manufacture to make each part of this invention workable in the manner for which it is intended.

OPERATION

The invention can be used in several ways. The following explains four possibilities. Referring to FIGS. 6A through E of the drawings the operation of the invention will be described.

Figure 6:
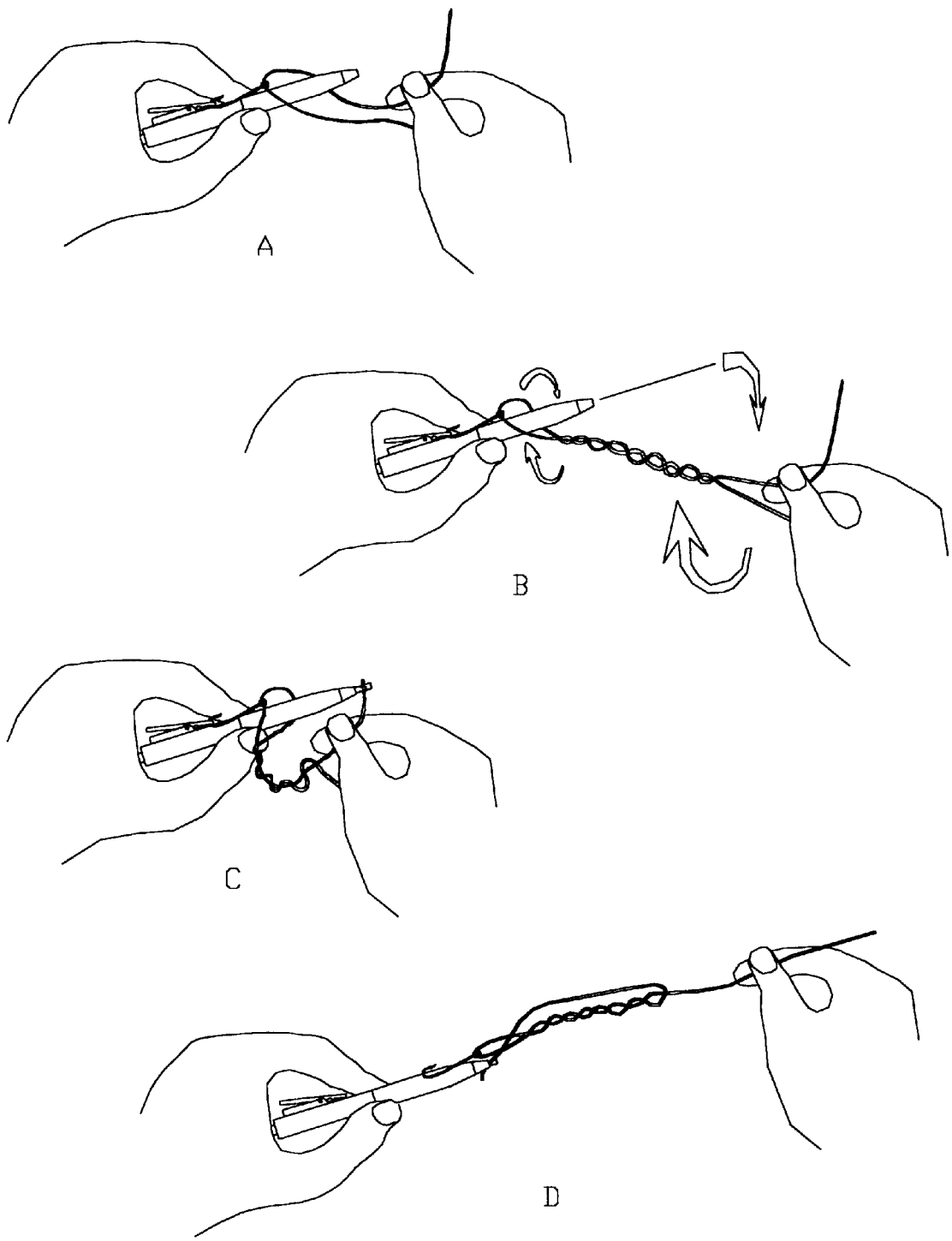

A. To Tie a Leader or Line to a Hook.
   While holding the knot tier in one hand, place the curve of the fishing hook in the jaws of the clip on the knot tier so the shank and eye of the hook are pointing in the direction of the distal end of the body (FIG. 6A). Thread the line or leader through the eye of the hook (FIG. 6A). With the other hand, grasp the end of the line between the thumb and index finger allowing 1 inch to 1½ inches of the end of the line to protrude beyond the finger and thumb (FIG. 6A). Grasp the other portion of the line in the same hand allowing the two lines to run parallel to the body of the tier with enough line to extend beyond the tip end of the instrument (FIG. 6A). Move the tip so it is positioned between the two parallel lines or leaders (FIG. 6A).

While continuing to hold the line turn the entire instrument in a wobbling action around the grip of the two lines, this will allow the two portions of the line to wind around each other (FIG. 6B). (This wobbling motion around an axis is sometimes called nutation.) After completing 5 or 6 turns, depress the push button to expose the slot in the end of the tier (FIG. 6C). Insert the end of the line into the slot far enough to allow a good "grasp" when the push button is released. Hold the line in the slot while releasing pressure on the push button (FIG. 6C). The end of line will be secured between the slot and the end of the tire body. Release the end of the line between the finger and the thumb. Pull on the other portion of the line already secured in the same hand to remove the slack in the line (FIG. 6D). While continuing to pull the line, release the hook from the clip to allow the hook to be pulled toward the tip of the tier as the line is tightened (FIG. 6D). When the eye of the hook reaches the end of the tier hold the hook securely about ⅛ of an inch from the point of the tier (FIG. 6D). While holding the hook at this position, continue pulling the line until the line is securely cinched around the eye of the hook. Release the end of the line secured by the slot and body by depressing the push button. The knot has been tied. The excess line protruding from the eye of the hook can be trimmed by using the clip/cutter. This can be accomplished by placing the end of the line into the cutter at the desired trim length and holding it there while opening the clip (closing the cutter). The line should not be trimmed closer than ¹⁄₁₆ of an inch from the eye of the hook.

B. To tie a leader or line to a swivel.
   Tying a line to a swivel is similar to tying a line to a hook. The only difference is that the swivel needs to be securely held by the jaws of the clip in such a way as to allow the threading of the line through one eye of the swivel.

C. To tie a leader or line to a lure.
   Tying a line to a lure is similar to tying a line to a hook. The only difference is that the lure needs to be securely held by the jaws of the clip in such a way as to allow the threading of the line through the eye or ring of the lure.

E. To cut the hook from the line or leader when a clip/cutter is attached.
   Place the eye of the hook close to the cutter so the leader or line is cut when the cutter is activated.

What is claimed is:

1. A knot tying device with an alligator clip attached thereto including:
   upper and lower elongated hollow bodies or barrels with longitudinal bores throughout to house a lower retractable tubular piston or shaft, an upper piston or button and a spring with said barrels being joined together by internal and external threads or overlapping glueable joints, the lower barrel may be tipped with an insert to aid in holding a leader or line during a knot tying process the upper barrel having said alligator clip attached thereto to hold a hook, swivel, artificial fly or lure during the knot tying process;
   a lower retractable internally spring mounted tubular piston or shaft slidably constrained within the bores of the upper and lower barrels and having an angled slot cut near the distal end of the tubular piston or shaft with the slot in said shaft to help hold a free end of a line or leader to the tip of the barrel when the leader or line is placed in said slot and said shaft is retracted into said barrels allowing said line or leader to be secured between said slot and the tip end of the lower barrel or the external end of the insert with pressure being applied by means of a spring encircling said tubular piston or shaft with said shaft having lugs or a spring stop located along the shaft with said lugs or spring stop allowing contact between the barrels and said shaft by means of said spring with said spring stop being formed by lugs, a shoulder, or some other attachment to the shaft and with the proximal end of said shaft fitting into said bore in the upper piston or button; wherewith said tubular piston or shaft in conjunction with the end of said lower barrel or the external end of the insert will hold the free end of the line or leader during the knot tying process;

said upper piston or button being slidably constrained in the distal end of said upper barrel with said piston having a short bore located longitudinal and centered in the piston to accommodate the proximal end of said lower tubular piston or shaft with said upper piston having a reduction in diameter to form said button and said reduction forming a stop or shoulder that will make contact with the shoulder of the terminal bore in said upper barrel when said tubular piston or shaft is retracted into said upper and lower barrels by means of said spring wherewith said upper piston or button is used to activate said lower tubular piston or shaft during the knot tying process;

said spring encircling said lower tubular piston or shaft with one end of said spring contacting the spring stop or tugs on said lower tubular piston or shaft and the other end of said spring making contact with said shoulder created by the terminal bore in the lower barrel or the internal end of said insert in the terminal bore in said lower barrel, said spring allowing said lower piston or shaft to be projected or retracted by compressing or decompressing said spring with applied pressure to said button; wherewith said spring applies pressure to said lower tubular piston or shaft which in turn by means of said slot in said shaft holds or secures said free end of the line or leader to said tip end or external end of the insert in said lower barrel during the knot tying process;

said tip end created by the terminal bore in said lower barrel or an insert placed in the terminal bore will allow said lower tubular piston or shaft to move freely in a longitudinal manner through said bore or said insert with sufficient tolerance to secure said free end of the line or leader when placed in the slot in the distal end of said piston or shaft wherein said shaft is retracted into said lower and upper barrels by means of one end of said spring exerting pressure on said shoulder of said terminal bore in said lower barrel or said internal end of said insert and the other end of said spring exerting pressure on said lugs or spring stop located on said lower tubular piston or shaft; wherewith said tip end of said lower barrel or the external end of said insert and slot in said lower tubular piston or shaft act together to hold or secure said free end of the line or leader during the knot tying process;

said alligator clip attached or secured to said upper barrel and defined as having an upper and lower opposing u-shaped jaws joined together at a pivot point by a pivot pin with arms extending from said jaws distal to said pivot to allow opening and closing of the jaws against spring pressure with said spring pressure coming from a spring wound around said pivot pin and said spring having opposite ends in contact with each opposing arm and said spring holding said jaws in bias with one another when at rest wherewith said alligator clip being used to securely hold a hook, swivel, artificial fly or lure during the knot tying process whereby said alligator clip doubles as a clip to hold said knot tying device in a shirt or pocket.

2. A knot tying device as recited in claim 1, wherein said alligator clip is replaced with a modified alligator clip comprising;

said modified alligator clip attached or secured to said upper barrel and defined as having an upper and lower opposing flat and or u-shaped jaws, said jaws having smooth or serrated edges and joined together at a pivot point by a pivot pin, said u-shaped arms extending from said jaws distal to said pivot with said arms formed in such a way as to allow said arms to fit one inside of each other with tolerances sufficient enough to allow shearing or cutting action when said arms are depressed against spring pressure with said spring pressure being applied by a spring encircling said pivot pin, said spring having opposite ends in contact with each opposing arm holding said arms apart when at rest and also holding said jaws in bias with one another when at rest wherewith said jaws are opened so that when said arms are relaxed against spring tension said jaws are closed to enable said alligator clip to hold a hook, swivel, artificial fly or lure during the knot tying process and when said arms are depressed are used to trim excess line or leader from said free end of the line or leader with a shearing action after the knot tying process is completed with said alligator clip also doubling as a clip to hold said knot tying device in a shirt or pocket.

3. A knot tying device as recited in claim 1, wherein said lower tubular piston or shaft and said upper piston or button is made in one piece or in several pieces.

* * * * *